United States Patent
De Jonge

(10) Patent No.: US 6,804,364 B1
(45) Date of Patent: Oct. 12, 2004

(54) HEADSET

(75) Inventor: Johannes De Jonge, Heerenveen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/959,468

(22) PCT Filed: Apr. 29, 1999

(86) PCT No.: PCT/EP99/03019

§ 371 (c)(1),
(2), (4) Date: Jan. 28, 2002

(87) PCT Pub. No.: WO00/67521

PCT Pub. Date: Nov. 9, 2000

(51) Int. Cl.[7] .............................................. H04R 25/00

(52) U.S. Cl. ...................... 381/381; 381/374; 381/370; 381/375; 381/379; 381/383

(58) Field of Search .......................... 379/430; 381/374, 381/375, 381, 379, 370, 376, 383, 330; 455/575.2, 575.1

(56) References Cited

U.S. PATENT DOCUMENTS

| | | | |
|---|---|---|---|
| 3,862,378 A | 1/1975 | Norris | |
| 4,932,052 A | 6/1990 | Lo | |
| 5,446,788 A | 8/1995 | Lucey et al. | |
| 5,903,644 A | * 5/1999 | Scheider et al. | 379/430 |
| 6,449,374 B1 | * 9/2002 | Skulley et al. | 381/381 |

FOREIGN PATENT DOCUMENTS

| | | |
|---|---|---|
| EP | 0779763 A1 | 6/1997 |
| GB | 2303515 | 2/1997 |
| WO | WO90/00340 | 1/1990 |
| WO | WO97/27722 | 7/1997 |

* cited by examiner

Primary Examiner—Curtis Kuntz
Assistant Examiner—Tuan Duc Newten
(74) Attorney, Agent, or Firm—Burns, Doane, Swecker & Mathis, L.L.P.

(57) ABSTRACT

This invention relates to a new type of headset solution. The headset according to the invention has a spring loaded hinge placed in front of the ear, which guarantees a stable pressure for any ear size. The headset according to the invention can be used, for example, as a cordless telephone headset or a cordless computer headset.

6 Claims, 6 Drawing Sheets

HEADSET

This invention relates to a new type of headset solution. The headset according to the invention can be used, for example, as a cordless telephone headset or a cordless computer headset.

The use of headsets has steadily increased, especially among the field of communications. Telephone headsets and computer headsets are becoming more and more common as the use of headsets for new type of multimedia applications increases.

The first models of headsets were quite massive in construction and also heavy and very uncomfortable to use. The early models also had two loudspeakers, one for each ear. The development of technology made it possible for headsets to be designed to meet better the demands of the user with regard to comfort of use.

Headsets became available in lightweight structures and in small sizes. Even small button type loudspeakers and clip type microphones were developed where the connection cord could weigh more than the headset equipment itself. As the cordless communications technology developed the customer demand on mobility also grew.

Headset solutions such as the aforementioned small button type loudspeakers and clip type microphones were then connected to various types of cordless communications transceiver devices. The cordless communications transceiver device was then carried in the user's pocket or attached to the user's belt.

In the state of the art headsets the loudspeakers, microphones and communications transceiver devices are combined to a single headset device which is then attached to the user's ear. In cordless and portable headset equipment only compact headset types that are mounted on one ear are able to meet the high requirements set by the user in regard to comfort and user friendliness.

Many types of headsets have been developed using a wide range of principles to attach the headset to the ear. Two of the most common construction principles to attach the headset to the ear are the hook type headset and the fork type headset.

Figure 1:
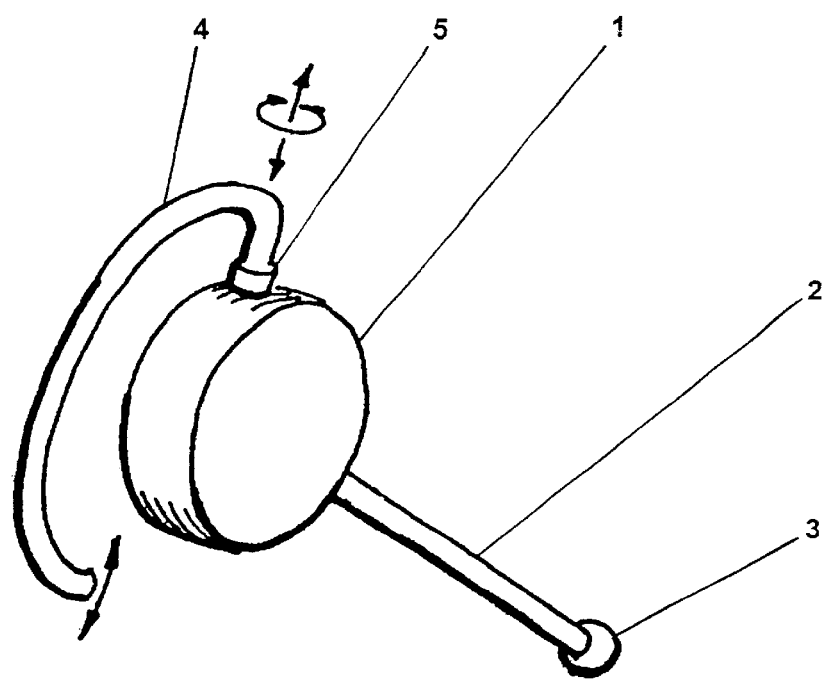
Figure 2:
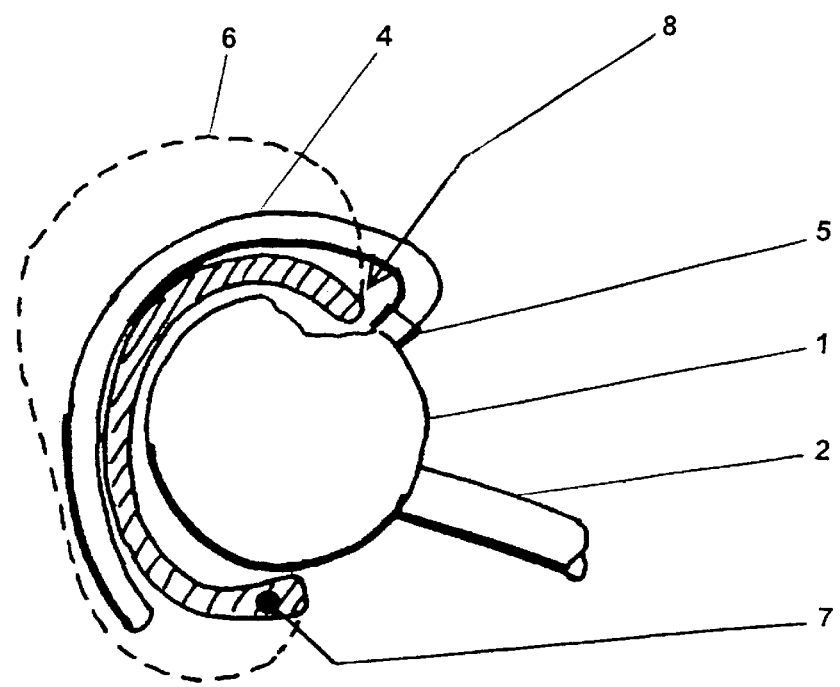
Figure 3:
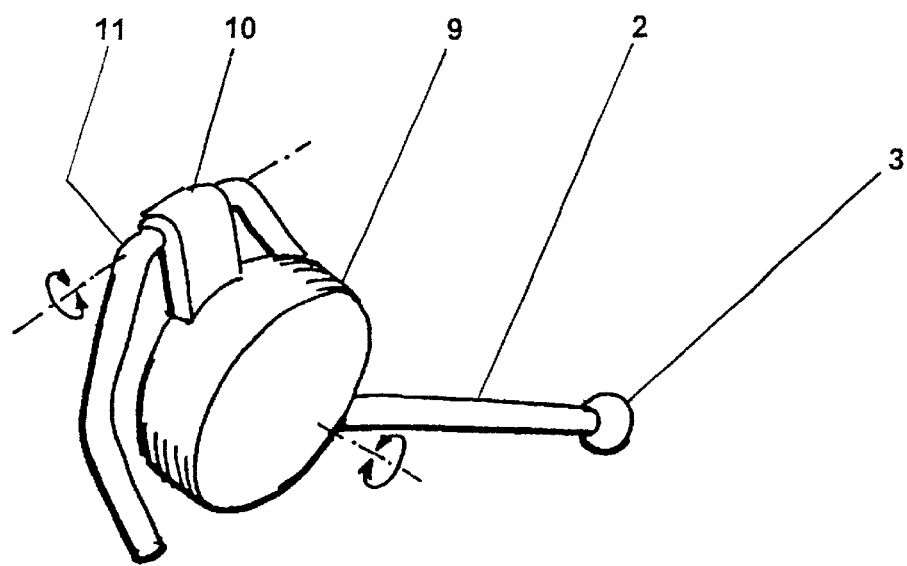
Figure 4:
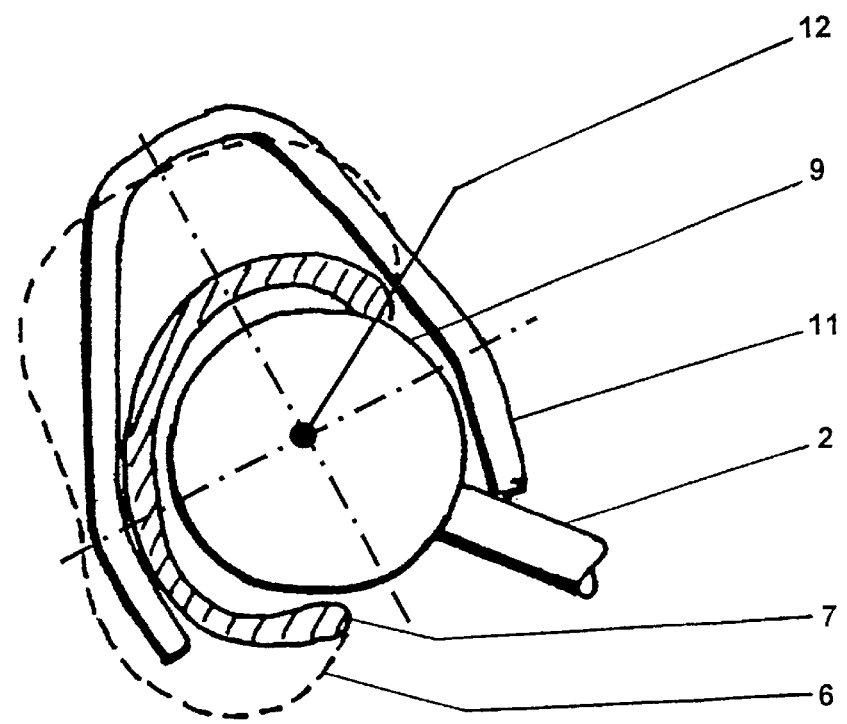

In the following, the prior art solutions will be described in more detail with reference to the accompanying drawings 1–4, in which:

FIG. 1 is an illustrative diagram showing a hook type headset according to prior art, FIG. 2 is an illustrative diagram showing a hook type headset according to prior art and positioning of the headset in regard to the user's ear, FIG. 3 is an illustrative diagram showing a fork type headset according to prior art, and FIG. 4 is an illustrative diagram showing a fork type headset according to prior art and positioning of the headset in regard to the user's ear.

FIG. 1 shows a hook type headset according to prior art. The hook type headset comprises a loudspeaker/transceiver part 1, to which a microphone boom 2 carrying a microphone 3 is jointed. The hook type headset also comprises a hook means 4 to attach the headset to the user's ear. The hook means 4 is connected to the loudspeaker/transceiver part 1 at a connection point 5.

The hook type headset can be adjusted by bending or extending the hook 4 or by supplying hooks 4 in several sizes, which hooks 4 are then to be mounted by the user. In order to find a comfortable position for the headset in reference to the user's ear the hook means 4 can usually be adjusted by turning it on the connection point 5. This turning adjustment is usually based on a friction-loaded hinge at the connection point 5. Because of the differences in ears of the different users, there sometimes also has to be size adjustment on the direction of the hook 4 axis at the connection point 5. This is done in order to have the loudspeaker opening in line with the ear-reference-point.

FIG. 2 shows a hook type headset according to prior art and positioning of the headset in reference to the user's ear. The hook type headset comprises a loudspeaker/transceiver part 1 with a microphone boom 2 and a hook means 4 that is connected to the loudspeaker/transceiver part 1 at a connection point 5. In the diagram the user's ear is marked with reference number 6 and the root of the user's ear is marked with reference number 7. The hook type headset is a form locked solution with mass equilibrium around the hinge-point 8 on top of the root of the ear 7. The headset keeps its' position by friction which is caused by permanent misfit.

The hook type headset according to prior art has several disadvantages. Local high pressure on the ear causes irritation after longer use. The necessary pressure is hard to predict as human ears are a wide range of sizes. After a prolonged period of use the flexible ear gives way and deforms slightly and the friction loaded connection point 5 moves slightly. This reduces the friction on the ear and decreases significantly the stability of the headset. An international patent application WO 97/27722 shows another example of a hook type headset according to prior art that has a spring loaded hinge placed in back of the users ear. The adjustable or exchangeable parts make this solution complex and difficult to use and also require the manufacturing of the different components.

FIG. 3 shows a fork type headset according to prior art. The fork type headset comprises a loudspeaker/transceiver part 9, to which a microphone boom 2 carrying a microphone 3 is jointed. The fork type headset also comprises a fork holder 10 and fork means 11 to attach the headset to the user's ear. Usually the microphone boom 2 can be rotated with respect to the fork holder 10 so that the microphone 3 position can be adjusted.

FIG. 4 shows a fork type headset according to prior art and positioning of the headset with regard to the user's ear. The fork type headset comprises a loudspeaker/transceiver part 9 with a microphone boom 2 and a fork means 11 that is connected to the loudspeaker/transceiver part 1 via the fork holder. In the diagram the user's ear is marked with reference number 6 and the root of the user's ear is marked with reference number 7. In a fork type headset a spring-loaded fork 11 presses the headset to the ear 6. The fork 11 surrounding the root of the ear 7 creates a hinge-point 12. Stability is based on both form and friction. The friction is stable for all ears 6 as using a spring-load compensates for size and shape changes. The width of the fork 11 can be adjusted for mounting on larger ears. A typical example of a fork type headset according to prior art is presented in a patent application GB-2303515A.

The fork type headset according to prior art has several disadvantages. The position of the headset is unstable, as the hinge point 12 created by the fork 11 surrounding the ear 6 is only vaguely defined. As the fork 11 has to give space for the top of the ear 6 the headset will be relatively thick and large. In general a position adjustment of the microphone is needed to get optimum sound quality. It is also hard to mount the headset with one hand only, and the mounting procedure is not intuitive. An international patent application WO 90/00340 shows another example of a headset according to prior art that is difficult to mount to the users ear.

The drawbacks of prior art are that headsets according to prior art are unstable and unpredictable. The position of the headsets in relation to the ear is somewhat undefined and they can cause irritating pressure locally. In use there is a need for adjustable or exchangeable parts. The mounting of the headset to the ear is also not simple and there is usually a need for using both hands when mounting the headset to the ear.

According to the first aspect of the present invention there is a headset provided that is characterized by having a hinge means, which is loaded by spring means, which hinge means is placed in front of the ear.

Figure 5:
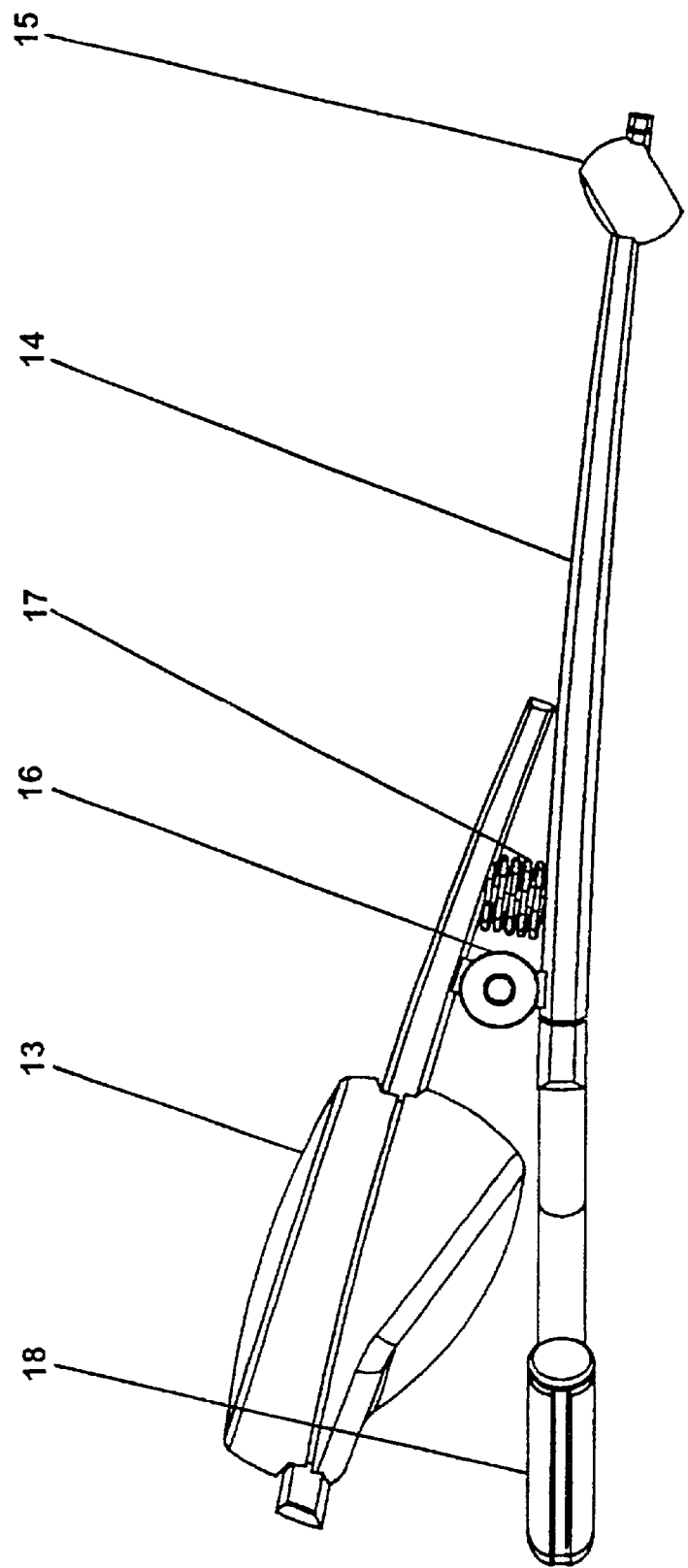
Figure 6:
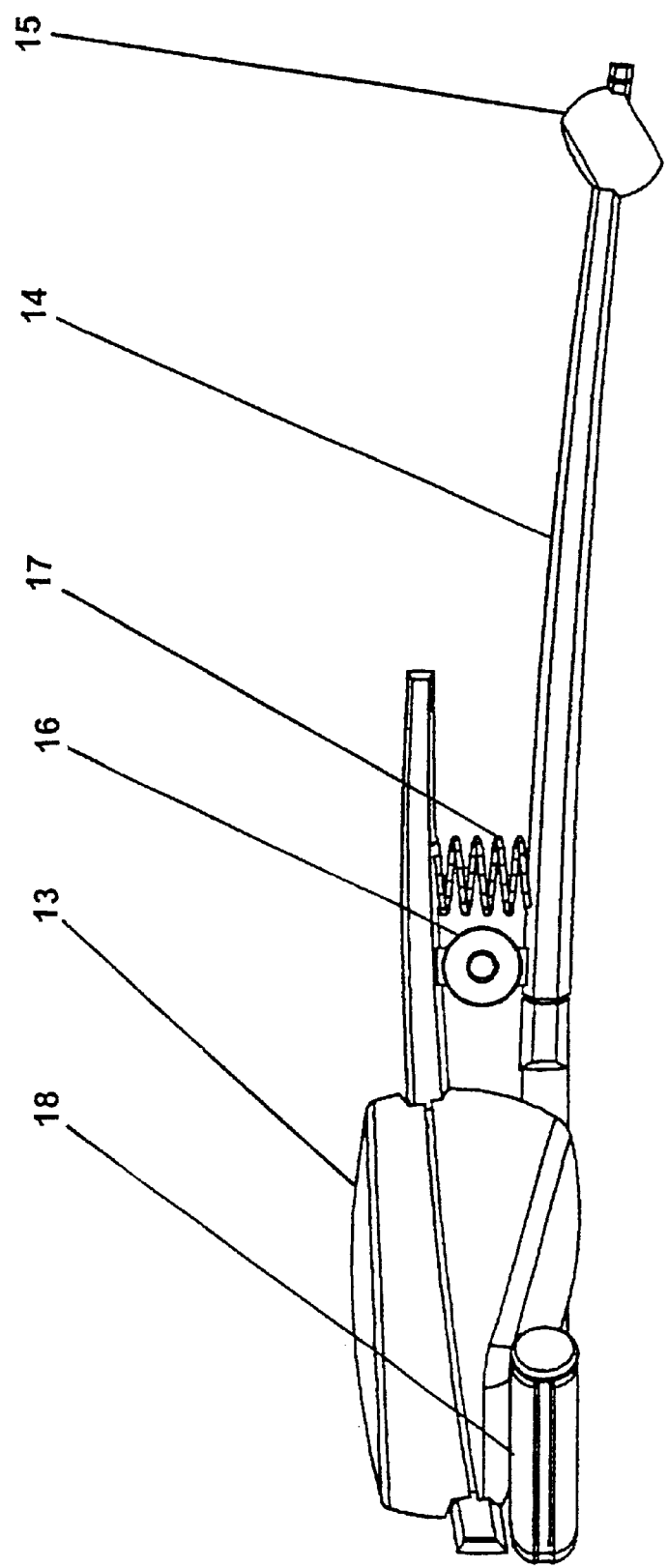
Figure 7:
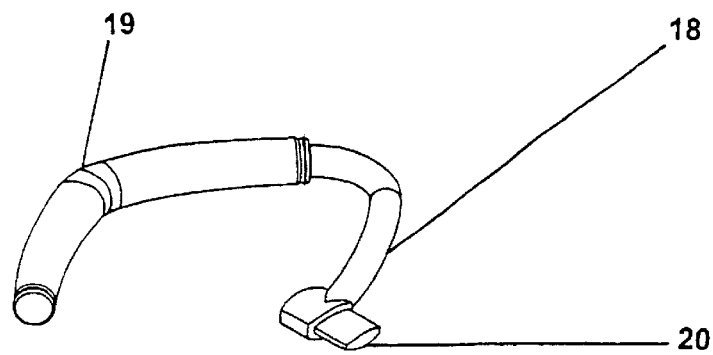
Figure 8:
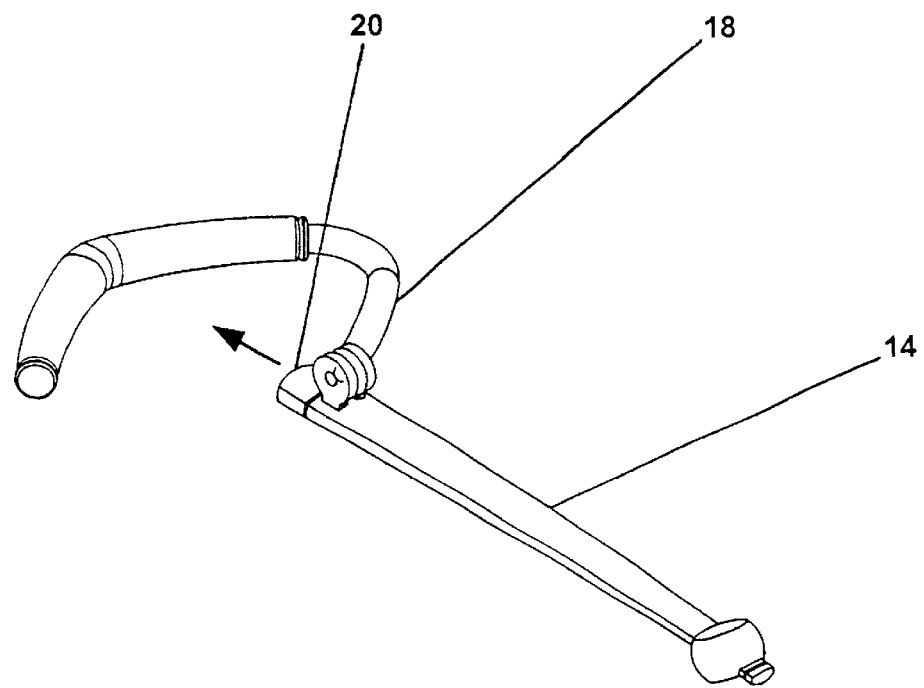
Figure 9:
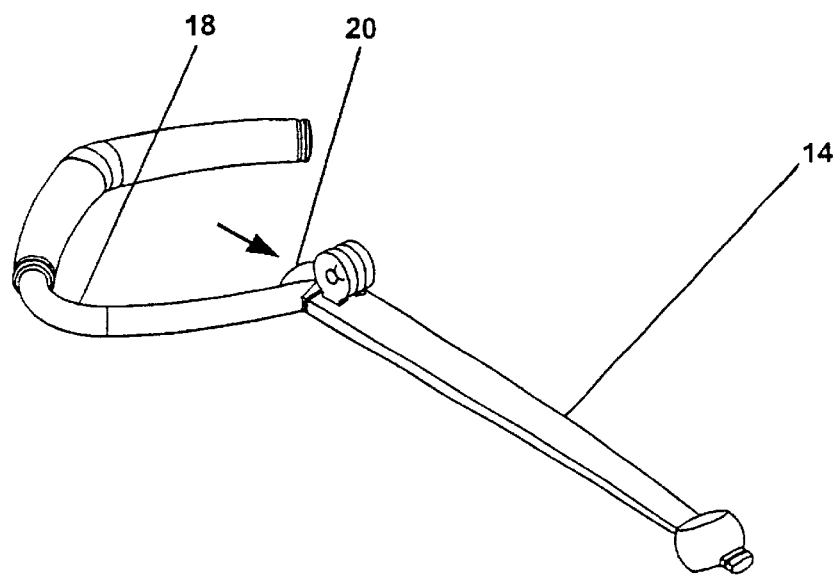
Figure 10:
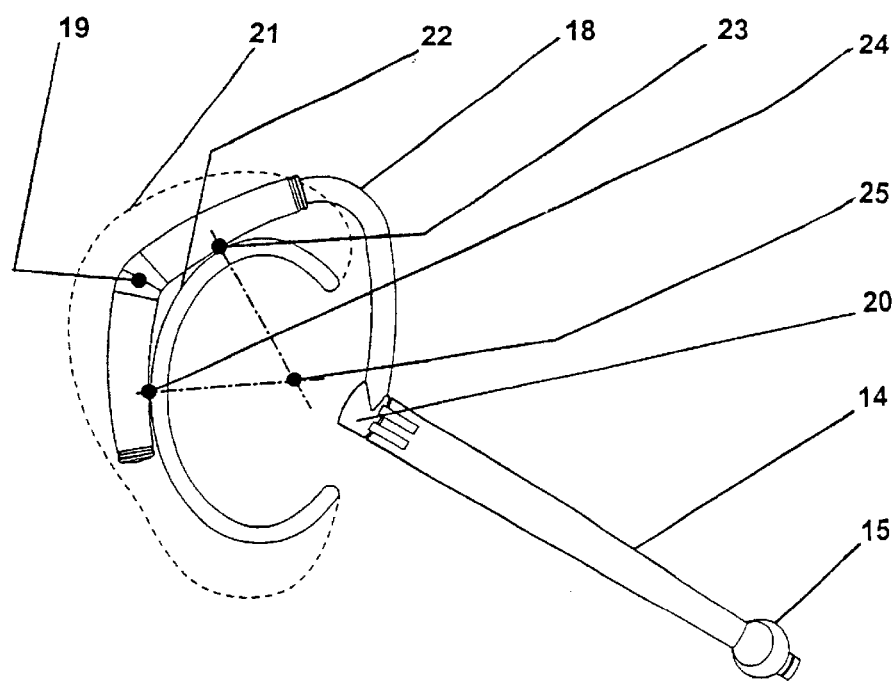

A more complete understanding of the system and method of the present invention may be obtained by the preferred embodiments that follow, taken in conjunction with the accompanying drawings, wherein:

FIG. 1 is an illustrative diagram showing a hook type headset according to prior art, FIG. 2 is an illustrative diagram showing a hook type headset according to prior art and positioning of the headset in regard to the user's ear, FIG. 3 is an illustrative diagram showing a fork type headset according to prior art, FIG. 4 is an illustrative diagram showing a fork type headset according to prior art and positioning of the headset in regard to the user's ear, FIG. 5 is an illustrative diagram showing a headset according to the present invention in opened position, FIG. 6 is an illustrative diagram showing a headset according to the present invention in closed position, FIG. 7 is an illustrative diagram showing a hook element of the headset according to the present invention, FIG. 8 is an illustrative diagram showing a headset according to the present invention that can be mounted in the user's right ear, FIG. 9 is an illustrative diagram showing a headset according to the present invention that can be mounted in the user's left ear, and FIG. 10 is an illustrative diagram showing a headset according to the present invention and positioning of the headset in regard to the user's ear.

The prior art solutions have been described in drawings 1–4. In the following, the solution according to the present invention will be described in more detail with reference to the accompanying drawings 5–10.

FIG. 5 shows a headset according to the present invention in opened position. The headset according to the present invention comprises a loudspeaker/transceiver means 13, to which a microphone boom 14 carrying a microphone 15 is jointed. The loudspeaker/transceiver part 13 is connected to the microphone boom 14 with a hinge means 16. The hinge means 16 is loaded with a spring means 17. The headset according to the present invention also comprises a hook means 18, which is used to attach the headset to the user's ear. The hook means 18 is connected directly to the microphone boom 14.

The headset according to the present invention has a hinge means 16, loaded by spring means 17 which hinge means 16 is placed in front of the ear having an axis in a vertical plane perpendicular to the microphone boom 14. This construction will provide a stable pressure for any ear size. FIG. 5 shows the headset when hinge means 16 is pressed to an opened position.

FIG. 6 shows a headset according to the present invention in closed position. The headset according to the present invention comprises a loudspeaker/transceiver means 13 connected with a spring 17 loaded hinge means 16 to a microphone boom 14 and microphone 15, and a hook means 18. FIG. 6 shows the headset when hinge means 16 is pressed to a closed position. In a headset according to the present invention the loudspeaker/transceiver means 13, the hinge means 16, the spring means 17 and the hook means 18 form a clamping arrangement so as to create a defined clamping force on the ear.

As the headset according to the present invention is attached to the ear by friction caused by spring 17 loaded hinge means 16 this gives extra freedom for the type of the hook.

FIG. 7 shows a hook element of the headset according to the present invention. The hook means 18 according to the present invention has a bend 19 and connecting means 20.

The hook means 18 according to the present invention is planar and in its plane symmetrical. The hook means 18 according to the present invention is designed so that it may be taken out and rotated 180 degrees to facilitate both left- and right-side use without extra parts.

FIG. 8 is an illustrative diagram showing a headset according to the present invention that can be mounted in the user's right ear. The hook means 18 according to the present invention is connected to the microphone boom 14 with the help of a connecting means 20.

FIG. 9 is an illustrative diagram showing a headset according to the present invention that can be mounted in the user's left ear. The hook means 18 according to the present invention is connected to the microphone boom 14 with the help of a connecting means 20.

FIG. 10 is an illustrative diagram showing a headset according to the present invention and positioning of the headset in regard to the user's ear. The headset according to the present invention comprises a hook means 18 connected to a microphone boom 14 and microphone 15. In the diagram the user's ear is marked with reference number 21 and the root of the user's ear is marked with reference number 22.

The hook means 18 according to the present invention has a bend 19 that defines contact points 23, 24 between ear-root 22 and hook. This results in a stable center point of rotation 25 around the ear root 22. This point of rotation 25 keeps loudspeaker opening point 25 and ear reference point 25 aligned without respect of the microphone boom inclination, thus guaranteeing optimum sound quality. The bend 19 in the middle of the hook means 18 also defines the point of rotation 25 so that it coincides with the center point of gravity 25 and thus creates optimum stability.

The headset according to the invention can also be provided with a cable for non-wireless use. In non-wireless use the loudspeaker/transceiver part 13 can be replaced with an ordinary loudspeaker.

The headset according to the invention guarantees a stable pressure for any ear size. The headset and the hook of the headset are designed so that mounting and understanding of the clip function is easy. The invention presents a solution in which the previously mentioned problems are solved in one product. With the help of the solution according to the invention production costs are reduced and user-satisfaction is improved.

What is claimed is:

1. A headset comprising a loudspeaker/transceiver means, a microphone boom carrying a microphone, a hook means, and a hinge means, which is loaded by spring means, wherein the hinge means is placed in front of the ear and has an axis in a vertical plane perpendicular to the microphone boom, and that the loudspeaker/transceiver means, the hinge means, the spring means and the hook means form a clamping arrangement as to create a defined clamping force on the ear.

2. A headset according to claim 1, wherein the hook means has a bend that defines contact points, between a user's ear-root and a stable center point of rotation around the ear root.

3. A headset according to claim 2, wherein the point of rotation coincides with a center point of gravity.

4. A headset according to claim 2, wherein the loudspeaker opening point aligns with an ear reference point.

5. A headset according to claim 4, wherein the point of rotation, center point of gravity, loudspeaker opening point, and ear reference point all coincide.

6. A headset according to claim 1, wherein the hook means can be rotated 180 degrees.

* * * * *